Jan. 2, 1951     I. J. LUNDAL ET AL     2,536,297
PROCESS OF STANDARDIZING DAIRY PRODUCT
Original Filed Sept. 7, 1942     3 Sheets—Sheet 1
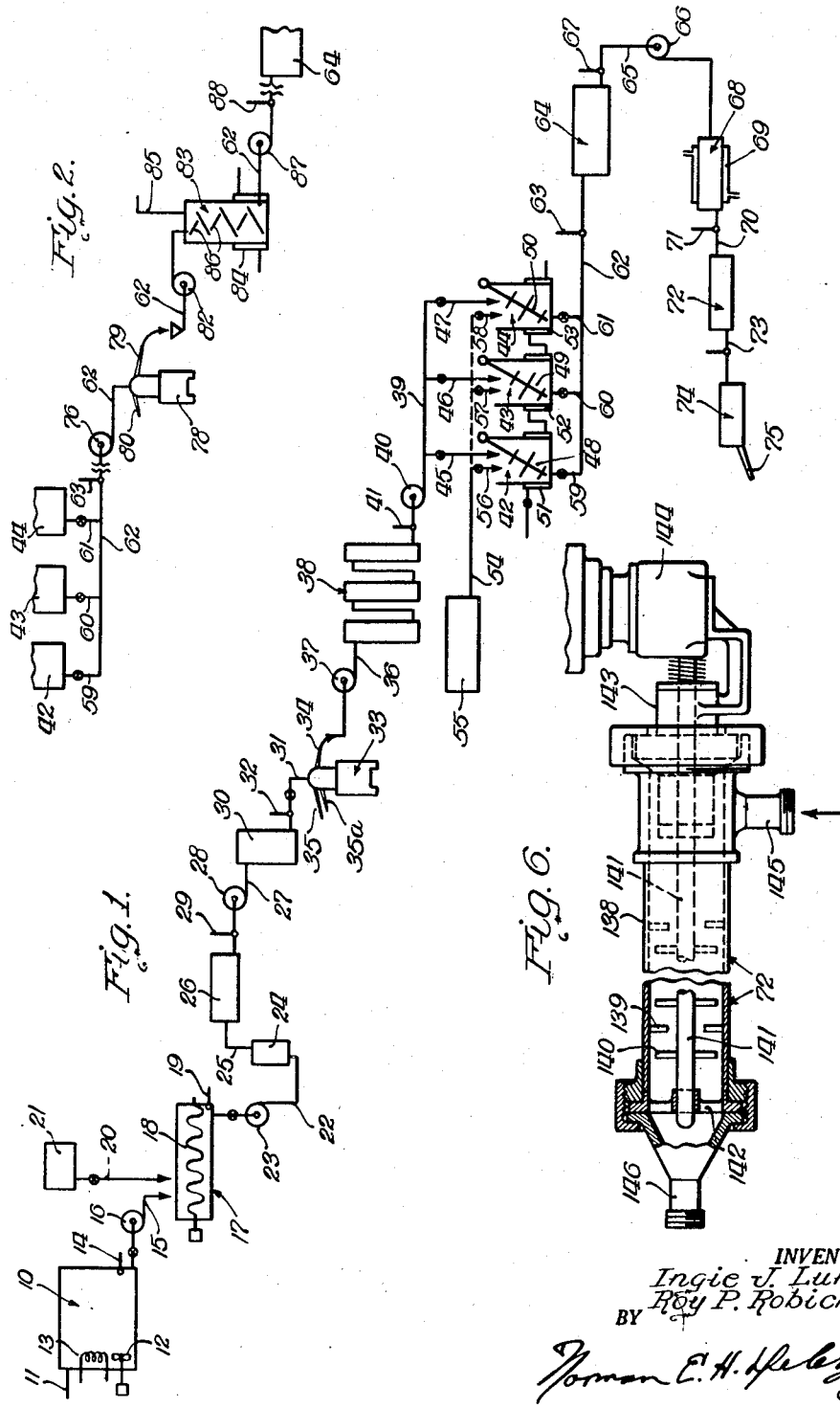
INVENTORS
Ingie J. Lundal
Roy P. Robichaux

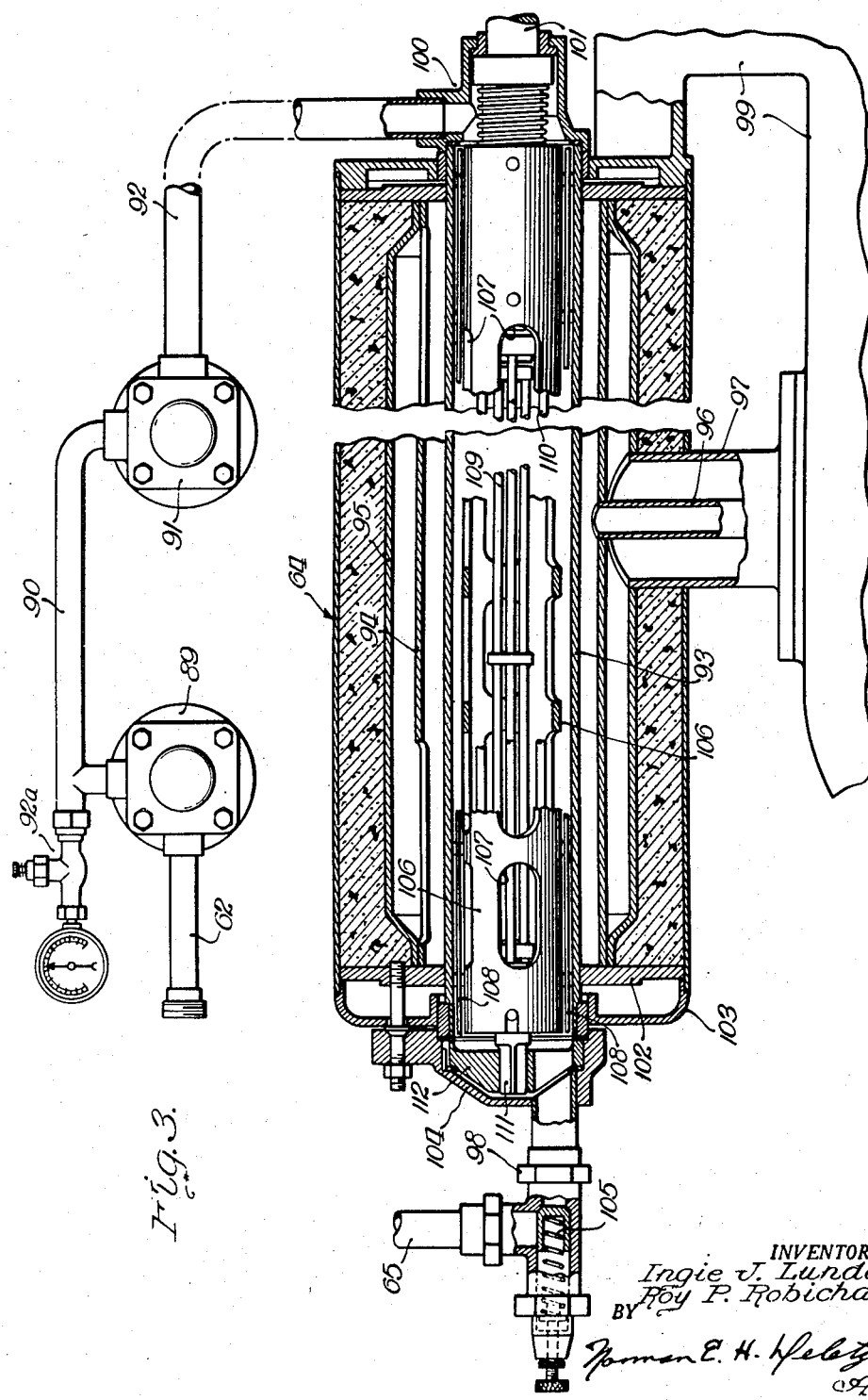

Jan. 2, 1951     I. J. LUNDAL ET AL     2,536,297

PROCESS OF STANDARDIZING DAIRY PRODUCT

Original Filed Sept. 7, 1942     3 Sheets-Sheet 3

INVENTORS.
Ingie J. Lundal
BY Roy P. Robichaux

Norman E. H. Lehtyke
Atty

Patented Jan. 2, 1951

2,536,297

UNITED STATES PATENT OFFICE 2,536,297

PROCESS OF STANDARDIZING DAIRY PRODUCT

Ingle J. Lundal and Roy P. Robichaux, Chicago, Ill., assignors to Sugar Creek Creamery Company, Danville, Ill., a corporation of Delaware, and Cherry-Burrell Corporation, Chicago, Ill., a corporation of Delaware, as joint owners Original application September 7, 1942, Serial No. 457,612. Divided and this application May 29, 1946, Serial No. 673,137

12 Claims. (Cl. 99—119)

This invention relates to the processing of lacteal fluids such as milk or cream and the like dairy products. More particularly, this invention relates to a process for standardizing a purified dairy product in the continuous or substantially continuous manufacture of butter or milk fat concentrate.

This application is a division of our co-pending parent application Serial Number 457,612, entitled, "Method of Making Butter and Butter Oil Concentrate," filed September 7, 1942, Patent No. 2,407,612.

The present accepted method of churning and working butter from cream containing approximately thirty per cent to forty per cent butter fat or milk fat and being either sour or sweet cream is to subject such cream, which has preferably been pasteurized and, when sour, neutralized, to a batch churning operation usually carried out in a conventional drum type of churn and butterworker. The conventional drum type of churn and butterworker is generally equipped with shelves and butterworkers designed to facilitate the churning of the cream and the working of the resultant butter.

Subsequent to the conventional batch churning and working operations, during which operations suitable quantities of standardizing materials, such as salt, water, coloring matter and flavoring matter, may if desired be added, the worked butter is removed from the churn and butterworker and packed for use into tubs or molded into blocks or prints of predetermined size and shape. The skillful "ripening" of the cream, neutralization of excess acid if present in the cream, pasteurization and other heat treatments of the cream, as well as the standardization thereof to secure the desired type and character of churned butter, normally require much apparatus and considerable time and skill.

The batch process of churning and working butter is, of course, very old. More recently various unsuccessful efforts have been made to produce butter continuously or substantially continuously by first processing the cream or other dairy product containing milk fat to produce thereby what is conventionally known as a "plastic cream" and then attempting by further processing to convert such "plastic cream" into suitable butter. Such continuous or substantially continuous processes of manufacturing butter have, however, been unsatisfactory and have not been adopted commercially.

Briefly stated in abstract form, in the few previously developed processes intended for use in continuously manufacturing butter, as well as in the preferred variant of the presently described process, the cream or dairy product containing milk fat is concentrated as, for example, by the use of a centrifugal separator. Such concentrate is utilized to produce a separation fraction wherein the milk fat content is in excess of that desired in the finished butter. The concentrated milk fat product may then be standardized by the addition of other ingredients commonly found in butter, such as salt, water, flavoring and coloring matters, etc., until the desired chemical and physical composition has been secured after which the product is solidified.

One of the apparent reasons for the commercial failure of the heretofore developed processes for continuously manufacturing butter is the inability to adapt such former processes to produce butter having the desired uniform composition and texture. Another and probably the chief reason for such failure is that the heretofore developed so-called continuous processes of making butter entailed a loss of milk fat substantially in excess of the loss of milk fat experienced in the conventional batch process of making butter. Such excessive loss of milk fat is apparently due to the inefficiency of those previously developed processes, which inefficiency may be due in particular to the effect on the cream of the performance of certain steps of such processes prior to the separation operation, resulting in the loss of a substantial quantity of milk fat with the separated skim milk and more viscous separated products other than cream. The excessive loss of milk fat experienced in the previously developed continuous or substantially continuous processes obviously rendered the same impractical.

It appears to be impossible in the normal separation of cream containing milk fat in the dispersed phase, which type of cream is usually the raw material in the butter manufacturing operation, to secure a satisfactory separation of the milk fat from the skim milk to enable the economic use of any of the heretofore developed continuous butter churning processes. It has, however, been found by extensive experimentation and research in the perfection of the instant invention, that when the cream or other like dairy product containing milk fat and milk solids is first subjected to a destabilizing treatment such as agitation and concurrent heating or cooling, before the milk solids have been partially set or before the physical characteristics of the milk solids have been changed by heat treatment such, for example, as high temperature pasteurization, then the destabilization operation brings about a substantial uniting of the milk fat globules normally present in such cream in the dispersed phase. It has further been found by the same experimentation that such a destabilized product containing the united milk fat globules may then be heated if necessary to a suitable temperature, and efficient and satisfactory separation of the milk fat from the skim milk and other non-fatty viscous material is possible. By this expedient the resulting loss of milk fat in the separation process is reduced to the point necessary to enable the economic manufacture of butter by the improved continuous method set forth in the following specifications.

In the manufacture of butter or standardized milk fat concentrate by a continuous process in which the milk fat of the product is in the oil or continuous phase prior to the solidification thereof, it has been exceedingly difficult to secure a proper distribution or dispersion of the standardizing ingredients such as salt, culture materials, coloring, flavoring materials and water, in the oil phase of the mixture. Unless a perfect distribution or dispersion is secured and maintained, the composition of the resulting butter or standardized milk fat concentrate is not uniform, and accordingly constitutes an inferior product.

The principal object of the present invention is to provide new and novel improvements in a process for the standardization of a dairy product such as milk fat concentrate or butter oil as a series of steps in the continuous or substantially continuous manufacture of butter and/or standardized milk fat concentrate, in which continuously manufactured butter or standardized milk fat concentrate the purified dairy product such as milk or cream may be expeditiously, efficiently and quickly converted into standardized butter or standardized milk fat concentrate. The invention contemplates the minimum loss of milk fat, with the use of a minimum quantity of apparatus, and a uniform dispersion of all of the standardizing ingredients throughout all of the butter or standardized milk fat concentrate manufactured according to the invention. Other objects of the present invention are to provide improvements in the specific method of standardizing the concentrated milk fat or butter oil whereby substantially purified and standardized milk fat concentrate as well as butter may be made continuously or substantially continuously in an efficient and quick manner while maintaining a uniform composition and distribution of the standardizing ingredients throughout the product.

Further objects of the present invention are to provide a process by which the product or products, i. e., milk fat concentrate and butter, when made continuously, may be made in such a manner as to possess various desirable chemical and physical properties which determine and improve the flavor, stability, uniformity, keeping qualities, texture and composition of the product or products, and by which such chemical and physical properties may be accurately controlled, regulated and varied at will.

Additional objects of the present invention are to provide an improved process whereby the milk fat concentrate, as well as the butter product, possesses improved keeping qualities, greater immunity from rancidity and a predetermined ratio of ingredients, and by which such product or products are substantially devoid of entrained deleterious gases which, if not removed, may cause the product or products to deteriorate.

Other objects and advantages, as well as the scope of the present invention, will become more obvious to those skilled in the art and will be more completely understood upon consideration and reference to the accompanying drawings and diagrammatic illustrations in which:

Figure 1 is a diagrammatic representation of apparatus suitable and well adapted for the performance of the preferred variant of the present invention. The diagram is in the form of a flow chart depicting the flow of lacteal fluid, such as milk or cream, in a continuous process in which such milk or cream is converted into milk fat concentrate and butter.

Figure 2 is a modified diagrammatic representation of additional apparatus intended for use in conjunction with the apparatus diagrammatically represented in Figure 1, whereby an arrangement is secured suitable for the performance of an additional variant of the present invention.

Figure 3 is an elevational view, partially diagrammatic and partially in broken-away section, of the preferred type of apparatus usable as a "prechurn" and also as a churn, illustrating the features thereof whereby the product passing therethrough may be heat-treated and processed under predetermined super-atmospheric pressure in the presence of a controlled quantity of gas for a given period of time while being agitated and maintained at a predetermined desired temperature.

Figure 4:
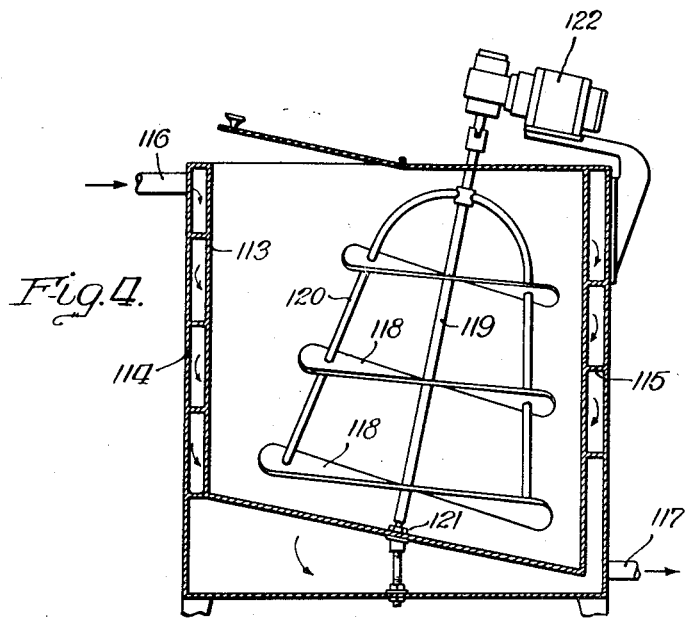

Figure 4 is a vertical sectional view of an alternative design of a "prechurning" apparatus.

Figure 5:
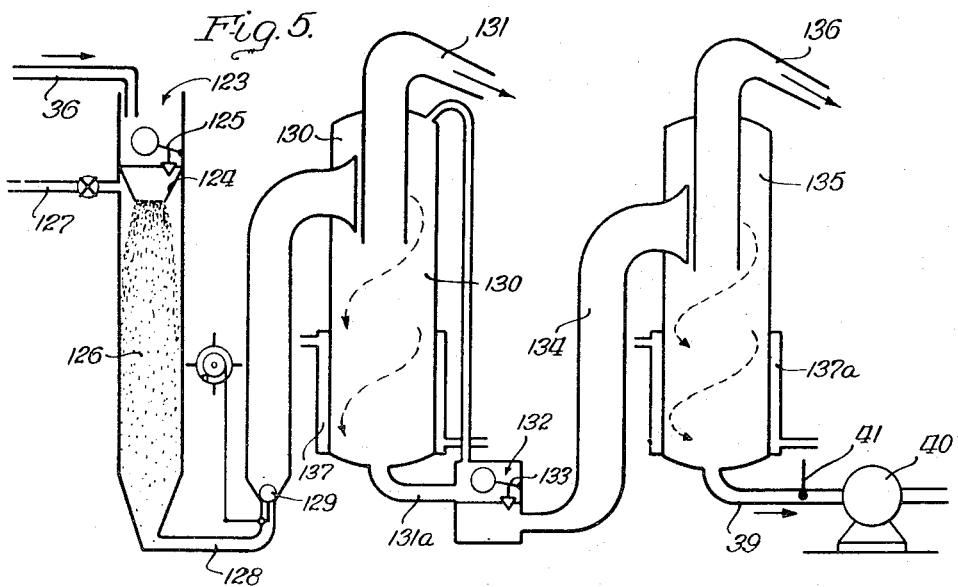

Figure 5 is an enlarged diagrammatic illustration of the preferred type of combined subatmospheric pasteurizing and deodorizing apparatus.

Figure 6 is a view, partially in broken-away section, of the preferred type of apparatus for use in texturating the solidified butter.

According to the preferred form of performing the instant invention, having reference particularly to Figure 1 of the drawings, in which drawings like numerals are used to identify like elements in the different figures, 10 represents a liquid storage tank of the type employed in creameries and other dairy plants for the storage of milk, cream and similar dairy products. The storage tank 10 may be of any conventional type, such, for example, of the type illustrated in U. S. Patent No. 1,929,709 and is provided with an inlet pipe 11, a conventional power-driven agitator 12 and a conventional heat exchange medium circulating coil 13 whereby the liquid stored in the tank 10 may be slightly agitated and heated or cooled to maintain the liquid at any desired temperature readily indicated by the thermometer 14.

The valve-controlled pipe 15 extends from the tank 10 and is suitably connected to a power-driven pump 16 for pumping the liquid from the tank 10 into a receiving and excess acid neutralizing vat 17. The vat 17 is provided with a suitable heat exchanger, such as a power-driven rotatable coil 18, and in general may be similar to the combined vat and heat exchanger illustrated in U. S. Patent No. 1,786,819. The heat exchanger type of vat 17 is provided for the purpose of heating or cooling a liquid, such as milk or cream, supplied thereto to any desired temperature readily indicated by the thermometer 19.

Suitable material for neutralizing or standardizing the excess acid content of the cream or milk in the vat 17 to any desired decreased degree of acidity may be supplied thereto by a valve-controlled pipe 20 from the neutralizing agent storage chamber 21. The heat exchange coil 18 is provided in the conventional manner with suitable connections (not shown) for circulating heat exchange medium therethrough.

A valve-controlled pipe 22 suitably connected to a power-driven pump 23 extends from the bottom of the vat 17 to a filter 24. The filter 24 may, if desired, be of the conventional type of cream filter generally illustrated in U. S. Patent No. 1,750,997. The conduit 25 is provided to convey the filtered liquid from the filter 24 to the "prechurn" 26.

The "prechurn" or destabilizing apparatus 26 in the preferred arrangement of apparatus for the present invention is constructed in accordance with the apparatus illustrated in Figure 3 of the drawings, which apparatus is described in detail hereinafter. Briefly stated, the destabilizing apparatus 26 in the preferred arrangement of apparatus comprises a combined agitating and heat exchange unit in which the product passing therethrough is agitated while being heated or cooled under predetermined super-atmospheric pressure conditions and at a predetermined temperature condition for a predetermined period of time in the presence of controlled quantities of gas. Generally speaking, the apparatus may be of the type clearly disclosed in U. S. Patent No. 2,278,340, and is preferably equipped with a device for automatically controlling the quantity of gas admitted into the "prechurn" or destabilizing apparatus. The presence of gas and the operation under pressure is not always essential. Such a device for controlling the mentioned admission of gas may be constructed in a manner or in an arrangement like unto that shown in U. S. Patent No. 1,907,486. An alternative form of "prechurn" is illustrated in Figure 4 of the drawings.

A conduit 27, to which is suitably connected a power-driven pump 28 and a thermometer 29, is connected to the discharge of the "prechurn" 26 for conducting the "prechurned" liquid to a liquid heater 30. The heater 30 is preferably of the indirect heat exchange type and may be a tubular type of heater, such, for example, as the type of heater illustrated in U. S. Patent No. 1,988,548.

The heated liquid passes from the heater 30 through a valve-controlled conduit 31, to which a thermometer 32 is suitably connected, to a centrifugal separator 33. The separator 33 is of the type capable of separating substantially concentrated milk fat from skim milk and from more viscous and heavier separation fractions which consist chiefly of milk solids. The three separation fractions in the order as mentioned are discharged, respectively, from the separator through separator discharge ducts 34, 35 and 35a.

The skim milk and heavier separation fractions are conducted by any suitable means (not shown) to any desired point of disposal. The substantially concentrated milk fat passes from the separator discharge 34 to a conduit 36 to which a suitable power-driven pump 37 is connected for pumping the substantially concentrated milk fat product to a pasteurizing device 38. The pasteurizer 38 is preferably of the combined pasteurizer and deodorizer type adapted to operate continuously under sub-atmospheric pressure. Such a type of combined pasteurizer and deodorizer is generally illustrated in the U. S. Patent, No. 2,314,455. The concentrated milk fat is both pasteurized and deodorized in such a continuous pasteurizer operating under sub-atmospheric pressure. Such a sub-atmospheric pressure pasteurizer will be hereinafter more fully described and is illustrated in more detail in Figure 5.

A discharge conduit 39 suitably connected to a power-driven pump 40 having a thermometer 41 for indicating the temperature of the liquid being discharged from the pasteurizer 38 extends from the pasteurizer 38 to a series of standardizing vats 42, 43 and 44. The pasteurized and concentrated cream or liquid containing milk fat may be discharged into any one or more of the respective vats in the order as numbered through the valve-controlled pipes 45, 46 and 47, each connected to the pasteurizer discharge conduit 39.

The standardizing vats 42, 43 and 44 may each be of any suitable type such, for example, as the type generally indicated in the U. S. Patent No. 1,848,957 or similar to the alternative form of "prechurn" illustrated in Figure 4 of the drawings. The above numbered standardizing vats are each respectively provided with a suitable motor-driven agitator 48, 49 and 50 and suitable heat exchange medium circulating jackets 51, 52 and 53, respectively. The heat exchange medium circulating jackets 51, 52 and 53 are each provided with heat exchange medium inlet and discharge connections which may be connected in series or individually in any suitable manner to a source of the desired heat exchange medium which may either be a heating fluid or a refrigerant as desired.

Standardizing material may be supplied through conduit 54 to the vats 42, 43 and 44 from the standardizing solution supply container 55 by means of the individual valve-controlled pipes 56, 57 and 58, respectively, which latter mentioned pipes communicate with the supply conduit 54. The vats 42, 43 and 44 are each connected by valve-controlled pipes 59, 60 and 61, respectively, to a conduit 62, to which a thermometer 63 is suitably attached, for conducting liquid from any one or more of the standardizing vats 42, 43 and 44 to the churn 64. The churn 64 is preferably a combined agitator and heat exchanger in which the standardized milk fat concentrate is agitated while being heated or cooled under predetermined super-atmospheric pressure to a predetermined temperature in a predetermined period of time in the presence of a controlled quantity of gas.

The churn 64, in the preferred arrangement of apparatus, is similar to the preferred type of "prechurn" 26 and may be a device of the type which is generally illustrated in detail in U. S. Patent No. 2,278,340. The churn 64 is also provided with an automatically controlled gas admission device which may be of the type similar to that illustrated in U. S. Patent No. 1,907,486.

A conduit 65, having a power-operated pump 66 and a thermometer 67 suitably connected thereto for indicating the temperature of the material being discharged from the churn 64, is provided for conducting material from the churn 64 to an aging and crystallizing device or apparatus 68. The pump 66 may in all instances not be required unless the pressure within the churn 64 is not sufficient to force the churned product to and through the remaining processing apparatus. The aging apparatus 68 is provided with a suitable heat exchange medium circulating jacket 69 having the necessary heat exchange medium inlet and outlet connections.

The aged and further crystallized product is conducted from the aging device 68 through pipe 70, to which a thermometer 71 is suitably connected, to a texturating device 72. The texturating device 72 is illustrated in more detail in Figure 6 and may be of the type of agitating and blending device generally indicated in U. S. Patent No. 2,130,113 wherein it is illustrated in connection with a proportioning or injecting device. The texturated product passes from the texturator 72 through conduit 73, to which a thermometer is suitably connected, to and through a molding and packaging device 74 from which the molded and packaged product is discharged through the discharge chute 75.

As mentioned above, several heat exchange devices form part of the apparatus used in connection with this new process. These heat exchange devices, such as the vat 17, the heater 30, the "prechurn" 26, the churn 64 and the agitating device 68, enable the accurate control of the temperatures and pressures of the product at the different stages of the process. It may be desirable for the regulation of such temperatures to provide suitable automatic controls, such, for example, as those commonly used in connection with these devices in commercial practice in order to assure the proper heat treatment of the product during the various stages of the process. Such automatic controls have not been illustrated in view of the fact that the application of such automatic controls to the apparatus used in connection with this improved process is well known in the art.

The arrangement of the apparatus, as above described in connection with the disclosure of Figure 1 of the drawings, is useful primarily in the continuous or substantially continuous production of butter in which a milk fat content of approximately eighty per cent is desired. In some instances it may be desirable to produce butter or a butter-like substance which contains approximately ninety-five per cent to one hundred per cent milk fat and having a satisfactory composition and texture when solidified. In still other instances it may be desirable to produce substantially pure untexturated milk fat.

It is advisable, in the event that a product consisting of substantially pure milk fat is to be made, to augment the apparatus shown in Figure 1 of the drawings. Such apparatus may be augmented by the inclusion in the arrangement of the apparatus illustrated in Figure 1 of the additional apparatus illustrated between the broken lines of Figure 2. When such additional apparatus, as is illustrated in Figure 2, is to be included in the arrangement of apparatus illustrated in Figure 1, then the conduit 62, through which the standardized milk fat solution flows to the churn 64, is broken immediately ahead of the churn 64, as illustrated in Figure 2, and the standardized product being discharged from one or more of the vats 42, 43 and 44, passes through a power-driven pump 76, through a continuation of pipe 62 into a second centrifugal separator 78. The separator 78 is similar to the separator 33 but is particularly well adapted for the centrifugal separation of a substantially concentrated milk fat containing product to produce a substantially pure milk fat which is discharged from the separator through the discharge duct 79.

Like unto the separator 33, the separator 78 is also provided with means for separately discharging the remaining fractions of the separation products, such as skim milk and viscous milk solids, which are discharged through the duct 80. The substantially pure milk fat passes from the separator discharge connection 79 through a continuation of pipe 62, which is provided with a power-actuated pump 82, to a moisture extractor or evaporator 83. The evaporator 83 consists of an enclosed chamber provided with a heat exchange medium circulating jacket 84 and a gas discharge or evacuating connection 85 which may be connected to any suitable source of vacuum (not shown). A simplified arrangement which has proven satisfactory in the modification embodying the elements shown in Figure 2 involves the deletion of the pasteurizer 38 ahead of the tanks 42, 43 and 44. For convenience the evaporator 83 may consist of a vacuum pasteurizer 38.

The concentrated milk fat solution introduced into the upper portion of the moisture evaporating chamber 83 passes downwardly therethrough by trickling or flowing in thin films over baffle plates 86. The concentrated milk fat is withdrawn from the lower portion of the chamber 83 through a continuation of pipe 62, to which a suitably power-driven pump 87 and thermometer 88 are connected, and is conducted by the continuation of pipe 62 to the churn 64.

The destabilizing device 26 and the churn 64, diagrammatically illustrated in Figure 1 of the drawings, are constructed in accordance with the more detailed representations of the preferred type of "prechurn" and churn apparatus shown in Figure 3 of the drawings. For the purpose of avoiding duplication, the description will be limited to an explanation of the churn 64 when connected to the supply conduit 62 and to the discharge conduit 65. The description of a suitable type of destabilizing device 26 will be the same as that given for the churn 64.

The fluid product to be treated in the churn 64 is supplied to the positive-acting, power-driven pump 89 from which it in turn passes through connecting conduit 90 to a second positive-acting, power-driven pump 91, which latter pump is preferably of larger capacity than the pump 89. A regulated but automatically acting gas admission valve 92a, in order to provide for the difference in capacities of the metering pumps 89 and 91, is connected to the conduit 90 to admit thereinto a predetermined quantity of gas, such as air or nitrogen or carbon dioxide, to supplement the deficiency in the fluid supplied by pump 89. The operation of the inter-connected metering pumps 89 and 91 and of the automatic gas admission valve 92a is so adjustable and so balanced by the regulation of the capacities of the pumps and the control of the valve 92a as to secure the admission of a controlled and predetermined quantity of gas through the valve 92a into the conduit 90. The gas so admitted into the conduit 90 in turn is intermingled by pump 91 with the metered and predetermined quantity of the product supplied by pump 89. The intermingled gas and liquid is forced by pump 91 under super-atmospheric pressure through conduit 92, to and through the processing chamber 93 of the churn 64, all of which may be done in a manner similar to that set forth in detail in U. S. Patents Nos. 1,907,486 and 2,278,340.

The processing chamber 93 is surrounded by concentric heat exchange medium circulating jackets 94 and 95 operatively connected with heat exchange medium supply and discharge passages 96 and 97, respectively. In the preferred embodiment of the invention the fundamental arrangement of the heat exchange medium jackets and the supply and discharge connections, which may be used for the circulation of heat exchange medium, such, for example, as a refrigerant, for cooling the processing chamber 93, is in keeping with the general arrangement set forth in U. S. Patent No. 2,132,932.

It should be noted from an examination of Figure 3 that the heat exchange medium jackets 94 and 95 do not extend through the entire length of the processing tube 93. A portion of the processing tube or chamber 93 at the head end thereof is not subjected to the action of the heat exchange medium in the heat exchange medium jackets and the product which passes through the processing chamber 93 before leaving the chamber passes through a portion thereof immediately adjacent the discharge end in which it is further processed without being subjected to further substantial heat exchange.

The precise proportionate length of the heat exchange chamber which is not subjected to the effect of heat exchange medium depends entirely upon the type of agitation to which the product being processed therein may be subjected after leaving the portion of the processing chamber 93 in which it is cooled or heated so as to permit the further completion of the effect of such cooling or heating before the product is discharged from the processing chamber through discharge connections 98. The heat exchange medium jackets 94 and 95 are insulated or jacketed in any conventional manner. The entire arrangement of processing chamber 93 and heat exchange medium jackets 94 and 95 is supported upon the base 99 in the manner as clearly shown in Figure 3.

The rear head 100 of the processing chamber 93 is attached thereto in any conventional manner, such as by screw threads or welding, and is provided with a laterally extending opening to receive the conduit 92. The rear head 100 is also provided with an axial opening which opens centrally into the processing chamber 93 and through which the stud shaft 101, which is fixed to the rear portion of the processing chamber agitator, passes. The front end of the heat exchange medium jacket arrangement is closed and sealed to the processing chamber 93 by front end plate 102 to which is fastened a jacket head 103.

A front cylinder head 104 for the processing tube 93 is securely fastened in any suitable detachable manner to the end plate 102 and is provided with a discharge aperture associated with the processing chamber discharge conduit 98. A discharge pressure control valve 105 is adapted to regulate the pressure within the processing chamber 93 by restricting the flow of the processed product being discharged through the conduit 98. The discharge valve 105 consists primarily of an adjustable spring-biased plunger of conventional design, as clearly depicted in Figure 3.

A compound agitator or "mutator" of two or more relatively movable elements is housed in the interior of the processing chamber 93 and extends longitudinally throughout the entire length thereof. The agitator, in its preferred embodiment, is comprised of a tube-like outer element 106 which is somewhat less in diameter than the internal diameter of the processing tube 93 and rotatably supported concentrically within the cylinder 93.

A suitable spider means is provided in the rear portion of the hollow outer element 93 for connecting the same to the stud shaft 101 which is supported for rotation in the rear head 100 and which stud shaft is powered by any suitable means, such as a variable speed source of power of conventional design (not shown). The outer tubular agitator element 106 is provided with four sets of elongated apertures 107, each set being disposed at an angle of ninety degrees to the adjacent set. The outer agitator member 106 is also provided with scraping blades 108 which may be detachably affixed to the outer member 106 in a suitable manner, as, for example, the manner clearly shown in U. S. Patent No. 2,278,340. The scraping blades 108 extend substantially throughout the entire length of the processing chamber and are positioned to overlie alternate sets of the elongated openings 107.

Two inner agitator elements 109 and 110 are provided on the interior of the outer agitator element 106. The elements 109 and 110 are concentrically supported within the outer agitator element 106 by a suitable arrangement of bearings, for example, in a manner as shown in the U. S. Patent No. 2,278,340. The front end of the processing chamber agitator is concentrically supported within the processing chamber by a front stud shaft 111 which is carried in a displacement spider 112 housed in the front cylinder head 104.

The product to be treated is pumped to and through the processing chamber 93 by the pump 91 and, while being cooled or heated within the chamber 93 as desired, is processed under super-atmospheric pressure at a predetermined temperature for a predetermined period of time in the presence of a controlled quantity of gas introduced into the product through valve 92a intermediate pumps 89 and 91. As the material and the intermingled gas passes through the processing chamber 93 it is forced into engagement with the surface of the cylinder 93 from which it is repeatedly scraped by the scraping blades 108 and forced through the openings 107 into the interior of the outer agitator member 106 to be severely agitated by the inner agitator members 109 and 110, thence to pass out again from the interior of the member 106 through the openings 107 into re-engagement with the heated or cooled surface of the processing chamber 93 from which it is again scraped and the entire agitating operation repeated.

While passing through processing chamber 93 of preferred proportions, the product contained in the interior of the processing chamber is of such a quantity measured in cubic inches and the inner heat exchange surface of the cylinder 93 is of such an area measured in square inches that the ratio of the heat exchange surface in square inches to the cubical content of the product within the chamber 93 varies between 1:1 and 1:1½. The capacity of the processing chamber 93 and the rate of supply of the pump 91 through the conduit 92 to the processing chamber 93 are of such relative proportions that the product requires approximately from one to four minutes to pass through the entire processing chamber while being processed therein.

The apparatus disclosed in Figure 3, which has just been described in the preceding paragraphs as a churn to be inserted in the processing system between the conduits 62 and 65, may also be used as the "prechurn" 26, as previously indicated. When the described device illustrated in Figure 3 is used as a churn then the heat exchange function thereof is, primarily, cooling. However, when the device is used as the "prechurn" 26, it may be used either as a combined refrigerating and agitating device or as a combined heating and agitating device. In each instance, when the combined agitating and heat exchange device is used either as the "prechurn" 26 or churn 64, the quantity of gas, such as air, or other suitable gas, such as nitrogen or carbon dioxide, introduced through the gas valve 92a must be regulated by the proper adjustments of the relative capacities of the positive-acting metering pumps 89 and 91 and the adjustment of the automatic valve 92a, whereby a suitable quantity of gas is supplied to the liquid being forced to and through the processing chamber under super-atmospheric pressure and in the presence of a controlled quantity of gas. The period of time during which the product is processed in the churn or "prechurn" device shown in Figure 3 depends upon the adjustment of the valve 105, the size of the cylinder 93 and the capacity of pump 91.

Although in the preferred embodiment of the arrangement and type of apparatus for the practice of the present invention, as shown in Figures 1 and 2, applicants have indicated the use of a "prechurn" of the type shown in Figure 3, it has, however, also been found that an alternative type of "prechurn," such as shown in Figure 4, may be used satisfactorily. It should, however, be noted that the alternative type of "prechurn" shown in Figure 4 canot be substituted for the churn 64 but the alternative type of "prechurn" may, however, also be used as the standardizing vats 42, 43 and 44. The alternative type of "prechurn" and standardizing vat illustrated in Figure 4 consists primarily of an inner liner 113 supported within an outer jacket 114 by the spaced heat exchange medium directing ribs 115 which so position the liner 113 within the jacket 114 as to form a heat exchange medium circulating passage therebetween.

A suitable heat exchange medium supply connection 116 and discharge conection 117 are provided. There is also provided within the vat liner an agitator having a plurality of blades 118 supported for rotation on agitator shaft 119. The blades 118 are joined at their outer peripheries by yoke 120. The agitator shaft 119 is suitably pivoted within the vat liner 113 on pivot 121 and at its upper end is disengageably keyed in a conventional manner to a suitable drive mechanism 122.

It should be pointed out that when the alternative type of destabilizer or standardizing vat shown in Figure 4 of the drawings is used as a standardizing vat, it is necessary to drive the multi-bladed agitator at such a speed as to achieve and maintain the desired dispersion of the standardizing ingredients throughout the liquid oil to be converted into butter or solidified milk fat concentrate. Similarly, for "prechuning" purposes the agitator must be driven at a suitable speed to effect "prechurning." The spacing of the agitator blades 118 along the shaft 119 with respect to the level of the product being agitated and heat-treated or dispersed within the device in order to facilitate and expedite either the "prechurning" or the dispersion, is preferably such as to enable the ready incorporation of suitable quantites of air or other gases into the product being "prechurned" or to secure the uniform disperson and mixing of ingredients throughout the oil when the device is used as a standardizing vat. Obviously the desired degree of agitation within the device, when used as a standardizing vat, is such as to secure and maintain the maximum dispersion of the standardizing ingredients without incorporating air or other gases into the product being standardized. The speed with which the agitator is driven by the motor unit 122 is appropriately controlled by the proper selection of the power unit 122.

The arrangement of apparatus, described with respect to the diagrammatic illustration shown in Figure 1, includes a pasteurizing unit 38. The preferable type of pasteurizer 38 is illustrated in more detail in Figure 5 and constitutes a combined pasteurizer and deodorizer adapted to operate continuously under sub-atmospheric pressure. As shown in Figure 5, the milk fat concentrate flowing through the conduit 36 is discharged into an atmospheric supply chamber 123 from which it is discharged into a distributing pan 124 through float valve 125. The distributing pan 124 is positioned at the upper extremity of a partially evacuated pasteurizing chamber 126 through which the milk is precipitated, preferably in the form of drops, from the distributing pan 124 in the presence of steam provided to the upper portion of the chamber 126 through a valve-controlled steam supply conduit 127.

The milk fat concentrate, while passing through the chamber 126 in the presence of steam, is quickly heated to pasteurizing temperature, which temperature is accurately controlled by he degree of exhaust to which the chamber 126 is subjected. The intermingled milk fat concentrate and steam flows from the lower portion of the chamber 126 through conduit 128 past a spring-biased pressure equalizer valve 129 into the upper portion of a partially evacuated deodorizing chamber 130. The deodorizing chamber 130 is provided at its upper end with a gas exhaust connection 131 connected to any suitable source of vacuum (not shown), whereby a desired predetermined degree of sub-atmospheric pressure is readily maintainable within chamber 130. Through conduit 128 and by means of equalizer valve 129, a lesser degree of exhaustion is readily maintainable within the chamber 126.

The intermingled milk fat concentrate and steam condensate passes from the conduit 128 in the form of a thin film down the wall of the deodorizer chamber 130 to accumulate in the lower portion thereof from which it is discharged through pipe 131a into the liquid seal 132. The product passes from the liquid seal 132 through float valve 133 into conduit 134 from which it passes into the upper end of a third partially evacuated chamber 135 to flow down the wall thereof in the form of a film. The chamber 135, like unto the chamber 130, is provided at its upper end with a suitable gas exhaust connection 136 connected to a suitable means of vacuum (not shown), by means of which the sub-atmospheric pressure within chamber 135 may be suitably controlled.

The intermingled fat concentrate, steam condensate and steam introduced into chamber 135 from the conduit 134 is spiraled down the walls of the chamber 135 in the form of a film to accumulate in the lower portion of the chamber from which it is pumped through conduit 39 by positive-acting pump 40. Both of the partially evacuated chambers 130 and 135 are provided with heat exchange medium circulating jackets 137 and 137a, respectively. The jackets 137 and 137a are provided with suitable heat exchange medium supply and discharge connections for the circulation of heat exchange medium through said jackets 137 and 137a. The milk fat concentrate, in the passage thereof through the combined pasteurizer and deodorizer as just described and of the type illustrated in Figure 5, is pasteurized and deodorized without substantially changing the quantity of milk fat concentrate supplied to the combined pasteurizing and deodorizing apparatus.

Although the combined pasteurizer and deodorizer, as shown in Figure 5 and as just described, is the preferred type of pasteurizing apparatus for use in the instant invention, other suitable combined pasteurizing and deodorizing devices, such, for example, as that illustrated in U. S. Patent No. 2,130,643, may be used. Obviously it is not always necessary to deodorize the milk fat concentrate in the practice of the instant invention and in such instance a less complicated pasteurizing apparatus, such, for example, as the type illustrated in U. S. Patent No. 1,693,034, has been found to prove satisfactory.

One of the final steps in the instant invention involves the texturating of the substantially completed butter product. The texturator designated by the numeral 72 in the preferred arrangement of apparatus, as illustrated in the diagrammatic representation of Figure 1, is illustrated in greater detail in Figure 6. The texturator, as shown in Figure 6, consists primarily of an outer jacket 138 provided on its inner surface with stationary agitator prongs 139 which co-act with the rotatable agitator prongs 140 carried by the agitator shaft 141. The shaft 141 is centrally supported for rotation within the outer jacket 138 by a front spider 142 and by an apertured rear head 143 through the aperture of which the shaft 141 extends. The shaft 141, at its rear extremity, is suitably connected to a driving motor 144. The texturator jacket 138 is provided adjacent its rear extremity with an inlet connection 145 and is also provided at its front extremity with a discharge connection 146.

To illustrate the aspect of the present invention which relates to the improved process of making butter by the use of the preferred arrangement and type of apparatus diagrammatically illustrated in Figure 1, lacteal fluid or a dairy product, such, for example, as sour cream, having a milk fat content in the dispersed phase varying between approximately twenty per cent to forty per cent and having an acidity varying between approximately two-tenths per cent to one and five-tenths per cent, is supplied through the supply pipe 11 to the storage vat 10. The sour cream in the storage vat 10 may be heated or cooled, as desired, and maintained at a predetermined temperature of preferably fifty degrees Fahrenheit by the circulation of the desired heat exchange medium through the heat exchange unit 13 of the tank 10 while the sour cream product is being agitated by the agitator 12. The temperature of the cream within the storage tank 10 is readily indicated by the thermometer 14.

The cream is pumped from the storage tank 10 by means of a power-driven pump 16 through the valve-controlled pipe 15 into the receiving or forewarming and acid-neutralizing vat 17. It is desirable in the preferred procedure to standardize or neutralize the excess acidity of the sour cream supplied to the vat 17 to an acidity of approximately .0 to .30% titratable acidity calculated as lactic acid. The neutralization of the excess acid is accomplished by the introduction into the vat 17 of a suitable quantity of acid standardizing or neutralizing solution, such as sodium hydroxide or potassium solutions, lime water or other desirable alkaline neutralizer. The acid neutralizer may be stored in supply tank 21 and provided to vat 17 through the valve-controlled pipe 20. The sour cream, to which the neutralizer has been added, is agitated in the vat 17 by the stirring coil 18 for a period of time sufficient to permit the substantial completion of the neutralization of the excess acid condition of the sour cream. The temperature of the cream supplied to the vat 17 is preferably heated or cooled to, or maintained at, a suitable working temperature, which temperature is readily indicated by the thermometer 19.

The heated and suitably neutralized cream is pumped from the vat 17 by means of the pump 23 through the valve-controlled pipe 22 to and through the filter 24 from which the filtered cream passes through the pipe 25 to the "prechurn" device 26. The preferred design of the "prechurn" 26 is shown in more detail in Figure 3.

The filtered cream passes from the conduit 25 through the metering pump 89, through the conduit 90 and through the second metering pump 91 which is preferably of a slightly larger capacity than the pump 89 and which intermingles with the metered cream a predetermined and controlled quantity of gas, such as air or nitrogen or carbon dioxide, admitted into pipe 90 through the automatic air inlet valve 92a. The pump 91 forces the metered quantities of cream and intermingled air or gas through the pipe 92 under super-atmospheric pressure to and through the processing chamber 93 of the "prechurn" 26. The "prechurned" cream is discharged from the discharge conduit 98 of the "prechurn" 26 past the automatic pressure control valve 105 into the pipe 27. While passing through the processing chamber 93 of the "prechurn" 26, the cream for a suitable period of time is subjected to violent agitation under super-atmospheric pressure in the presence of a controlled quantity of gas while at a temperature varying between thirty degrees Fahrenheit and one hundred ten degrees Fahrenheit which expedites or permits the ready uniting of fat globules of the milk fat product.

Such agitation of the tempered cream while passing through the "prechurn" causes a uniting of a substantial portion of the milk fat globules of the cream, either when the cream is heated or cooled, as above stated, and thereby changes the phase of at least a substantial portion of the milk fat content of the cream. The cream is agitated within the "prechurn," which may be of the preferred type or alternative type, for a sufficient period of time and to a sufficient degree to cause a uniting of the major portion of the fat globules contained therein, whereby the physical characteristics of the cream are so changed that the major portion of the fat content thereof is no longer in the dispersed phase as it is in normal cream. The heating or cooling of the cream within the processing chamber 93 is effected by the circulation of heat exchange medium, such as hot water or steam or other suitable heat exchange medium, provided with a heat exchange circulating space defined by the jackets 94 and 95 through the supply ducts 96, from which heat exchange jackets it is again discharged through the discharge conduit 97.

The "prechurned" or destabilized cream is discharged from the destabilizer 26 through the pipe 27, and by means of the pump 28 is forced to and through a heater such, for example, as a tubular heater, in which the temperature of the "prechurned' or destabilized cream is raised to approximately 120 degrees Fahrenheit, all as readily indicated by the thermometer 32 in the valve-controlled pipe 31 through which the cream is discharged from the heater 30 to the separator 33, preferably a centrifugal type of separator.

The separator 33 is preferably of the type which, by centrifugal action, is capable of separating the cream into three fractions. The skim milk fraction containing the major portion of the products of neutralization is discharged through the duct 35 to any convenient point of disposal and likewise the remaining milk solids and sediments are discharged with a small quantity of skim milk through the duct 35a.

The purified milk fat separation product containing a milk fat content preferably in excess of eighty per cent is discharged from the separator 33 through the duct 34 at a temperature of approximately one hundred twenty degrees Fahrenheit into the conduit 36 through which it is pumped by the pump 37 into a suitable cream or milk fat pasteurizer and deodorizer 38.

The preferred type and arrangement of the pasteurizer 38 for use in the practice of the present invention is diagrammatically illustrated in Figure 5 of the drawings.

The concentrated milk fat, while being pasteurized and deodorized, is precipitated in the form of droplets through the partially evacuated chamber 126. It is rapidly heated by direct contact with steam supplied through conduit 127 to the desired temperature of approximately two hundred degrees Fahrenheit for the necessary period of time to effect the pasteurization of the cream. The manner of controlling the temperature of the milk fat concentrate, while being pasteurized and deodorized in the preferred type of pasteurizer, has been previously explained. The commingled steam, condensed steam and milk fat concentrate passes into a second, partially evacuated and water-jacketed chamber 130 in which the pasteurized milk fat concentrate is subjected to further action under sub-atmospheric pressure which results in the liberation of some of the entrained gases and moisture, thereby effecting the substantial deodorization and partial cooling of the milk fat concentrate. The pasteurized, deodorized and partially cooled milk fat concentrate passes from such second chamber 130 of the pasteurizer 38 through a conduit containing a liquid seal 132 to a third partially evacuated and water-jacketed chamber 135. In this chamber the product is subjected to the effect of intense sub-atmospheric pressure or vacuum to further cool and in like manner further deodorize the cream or milk fat concentrate and remove therefrom the remaining excess moisture, some of which may have been introduced thereinto by the condensing of steam in the cream in the pasteurizing chamber of the combined pasteurizer and deodorizer, and to further cool the pasteurized, deodorized and partially cooled milk fat concentrate by the effect of further evaporation, as well as remove remaining entrained gases.

The cream or milk fat concentrate is discharged from the combined pasteurizer and deodorizer to the conduit 39 at a temperature above the melting point of the milk fat content of the concentrated oil. The normal temperature of discharge from the pasteurizer 38 is approximately 110 degrees Fahrenheit. The milk fat concentrate is pumped from the pasteurizer 38 through the conduit 39 by the pump 40 into the standardizing vats 42, 43 and 44 through the valve-controlled pipes 45, 46 and 47 communicating with the conduit 39. These standardizing vats are thus filled in rotation or sequence one at a time. It is necessary at this point in the process of the manufacture of standardized butter or standardized milk fat concentrate, to add to the liquid milk fat concentrate received from the pasteurizer 38 the desired quantities of standardizing materials such as salt, coloring, flavoring, starter solutions, and in some instances additional acid-neutralizing solutions and water. Obviously, to maintain the desired percentage of milk fat and the relative proportions between the various ingredients of the standardizing solutions and the milk fat, it is essential that the products supplied to the standardizing vats 42, 43 and 44 be suitably and accurately tested at this point in the process. Such testing and standardizing operations require time, and therefore the three standardizing vats have been provided so that while one vat which has been filled and suitably standardized is being emptied into the churn, as hereinafter described, the product which has been filled into the second vat may be tested and standardized while the third vat is being filled. Obviously, the procedure of filling, testing and standardizing vats 42, 43 and 44 is in rotation or sequence, and for this purpose the standardizing solution contained in the receptacle 55 may be conducted at will and as required, in view of the results of tests, through the pipe 54 and through the valve-controlled outlets 56, 57 and 58 into one or more of the vats 42, 43 and 44, respectively. Each of the standardizing vats 42, 43 and 44 is constructed in substance in accordance with the previously described arrangement shown in Figure 4 of the drawings, and as shown is provided with a jacket for the circulation of the heat exchange medium, preferably warm water, and a power-driven agitator. In a thus constructed standardizing vat, the concentrated milk fat or oil and the standardizing ingredients may be agitated under suitable temperature-controlled conditions to secure a complete and uniform dispersion of all of the standardizing ingredients throughout all of the mass of the heated and concentrated milk fat or oil contained within the respective vats. The predetermined temperature at which to accomplish the standardizing preferably varies between one hundred degrees Fahrenheit and one hundred twenty degrees Fahrenheit, at which temperature the milk fat portion of the concentrated milk fat is in a liquid condition. The concentrated milk fat, after the standardizing ingredients have thus been uniformly dispersed throughout the entirety of the content of the vat, is maintained at the mentioned elevated temperature while the standardized product is sufficiently agitated to maintain the achieved degree of dispersion of the standardizing ingredients without the incorporation of air or other gases into the standardized mixture. For example, while the milk fat concentrate is being supplied to vat 42, the concentrate previously supplied to vat 43 is tested and standardized, and the already standardized product in vat 44 is being agitated under heat control conditions to maintain the achieved degree of dispersion of the ingredients throughout the oil, while the standardized oil is being drawn therefrom through pipe 61 into the conduit 62.

The standardized milk fat product or concentrate containing approximately eighty per cent milk fat and a total of twenty per cent of one or more ingredients, such as milk solids, starter solutions, salt, water, coloring and flavoring matters, passes from the pipe 62 to the churn 64. The churn 64 includes the positively driven metering pump 89 from which the standardized milk fat concentrate is discharged into the connecting conduit 90 and from which it flows into the second metering pump 91 of slightly larger capacity, together with a controlled quantity of gas, such as air, nitrogen, carbon dioxide or other suitable gas, which has been introduced into pipe 90 through the automatic gas inlet valve 92a. The positively driven metering pump 90 commingles such gas and standardized milk fat concentrate drawn in from pipe 90 and forces the commingled product under super-atmospheric pressure through the conduit 92 to and through the processing chamber 93 from which it is discharged through the discharge connection 98 past the automatic pressure control valve 105 into the conduit 65.

The standardized milk fat solution which contains all of the ingredients of butter in the same predetermined proportionate quantities is subjected in the churn 64 to violent agitation under super-atmospheric pressure, preferably in excess of twenty pounds per square inch gauge, while said solution passes through the processing chamber 93 in a period of time varying between one and four minutes and in the presence of a controlled quantity of gas, preferably not in excess of twelve per cent, which gas is substantially uniformly intermingled with and distributed throughout said solution, mostly in the form of minute air pockets, while the solution is being super-cooled to a temperature varying between thirty degrees Fahrenheit and ninety degrees Fahrenheit. While such agitation is progressing the standardizing materials previously added to the solution are also substantially uniformly distributed throughout the solution.

The heat exchange medium which, in the instance of the churn 64, is a refrigerant, such, for example, as anhydrous ammonia, is supplied through the duct 96 and through the refrigerant jackets 94 and 95 which surround the processing chamber 93. After passing through the space formed by the heat exchange jackets 94 and 95, the gaseous refrigerant, in such instances where anhydrous ammonia is used, is discharged through the discharge conduit 97 of the cooling system for the churn 64.

While passing through the processing chamber 93, the standardized cream solution is rapidly chilled and super-cooled to a temperature varying between thirty degrees Fahrenheit and seventy degrees Fahrenheit, thereby solidifying in excess of fifty per cent of the milk fat content thereof. That portion of the milk fat content of the product which adheres to the inner surface of the cylinder 93 which defines the processing chamber is quickly scraped therefrom by the scraping blades 108 and is forced into the interior of the outer agitator member 106 and violently agitated therein by the compound agitating members 109 and 110, whereby any entrained gas and material other than milk fat is uniformly dispersed throughout the milk fat content of the product.

The standardized milk fat solution containing the various ingredients of butter in a predetermined desired proportion requires approximately from one to four minutes for its passage through the processing chamber 93. During such passage the product is converted into a partially solidified, super-cooled, homogeneous product which is discharged from the processing chamber 93 through the discharge connection 98 into the pipe 65 at a temperature preferably varying between thirty degrees Fahrenheit and seventy degrees Fahrenheit. The pump 66, when the discharge pressure of the churn 64 is low, may be used to force the super-cooled product discharged from the churn 64 to and through an aging and crystallizing chamber 68.

The super-cooled product introduced into the chamber 68 under the pressure of the product being discharged from the churn 64 or under the pressure of the pump 66 is permitted to further crystallize for a period of time varying between one and eight minutes depending on the temperature of the product under controlled temperatures and pressure conditions within the chamber 68. The control of the temperature is effected by the circulation of heat exchange medium through the jacket 69 and the temperature thereof is such that the aged and further crystallized product is discharged from the aging chamber at a temperature of approximately forty-five degrees Fahrenheit. When so discharged therefrom, the butter product passes through the conduit 70 at a temperature of approximately forty-five degrees Fahrenheit to and through the texturating device 72. In the texturating device the butter product is suitably agitated and worked to produce the desired texture and body. The preferred type of texturator is disclosed in Figure 6 of the accompanying drawings.

The butter product is discharged from the texturator 72 through the conduit 73 to and through a suitable molding or printing and wrapping device 74, from which device the finished butter is discharged through the passage 75.

The flow of the product through the pipe 65, the aging device 68, the texturator 72 and the printing and molding device 74 is all effected by the pressure of the product being discharged from the churn 64 which may, if desired, be aided by the pump 66 in the pipe 65.

The process just described is employed primarily in the manufacture of butter when it is desired to produce butter having a milk fat content of approximately eighty per cent. As mentioned in connection with the description of the apparatus diagrammatically illustrated in Figure 2, it may at times be desirable to produce a substantially pure milk fat product containing approximately ninety-nine per cent milk fat. It is desirable in such instances to further purify the milk fat prior to the introduction thereof into the churn 64, for which purpose the additional apparatus illustrated in Figure 2 is connected into the conduit 62 in the manner illustrated in Figure 2 to thereby supplement the apparatus diagrammatically illustrated in Figure 1. However, as previously mentioned, the vacuum pasteurizer 38 may be eliminated entirely or substituted in place of the evaporator 83. The processing of the milk fat concentrate in this second variant of the instant invention, i. e., the production of a substantially pure milk fat, is in substance the same as previously described in connection with the making of butter by the improved process until the milk fat concentrate is discharged in rotation, as previously mentioned, into the standardizing vats 42, 43 and 44, except the possible pasteurization ahead of the standardization in said vats. The milk fat product containing approximately eighty per cent to eighty-five per cent milk fat as supplied to the standardizing vats 42, 43 and 44 is further neutralized in the standardizing vats in this second variant of the present invention by adding to the milk fat concentrate at this stage of the process a suitable quantity of excess acid-neutralizing solution of the type previously mentioned. The neutralizing agent may be stored in the tank 55 and supplied to the vats through the conduits 54 and the valve-controlled outlets 56, 57 and 58. The milk fat concentrate, to which the neutralizing solution has been added, is then agitated for a sufficient period of time in the particular vat 42, 43 and 44 until the neutralization thereof is completed and the acidity reduced to approximately .0%. The neutralized concentrated milk fat product is then heated to approximately one hundred seventy degrees Fahrenheit in the vats 42, 43 and 44 and discharged therefrom into the conduit 62 through the corresponding valve-controlled outlet and is pumped by the pump 76 through a continuation of the conduit 62 into the separator 78 at a temperature of approximately one hundred seventy degrees Fahrenheit to which temperature the milk fat concentrate was heated in the standardizing vat into which it was discharged from pipe 39. Such heating obviously will effect the pasteurization of the product.

Similar to the separator 33, the separator 78 is of the centrifugal type capable of centrifugally separating the concentrated cream product. The skim milk separation product or phase is discharged through the duct 80 to any suitable point of disposal.

The substantially pure milk fat product is discharged from the separator 78 through the duct 79 at a temperature of approximately one hundred seventy degrees Fahrenheit into a continuation of the pipe 62, through which it is pumped by the pump 82 into a partially exhausted chamber 83 or the pasteurizer 38 if the latter has been substituted for chamber 83. Chamber 83 is provided with an exhaust conduit 85 connected to a suitable source of vacuum (not shown) capable of maintaining a degree of exhaust in said chamber sufficient to remove from said milk fat concentrate any entrained gas and moisture. The substantially pure milk fat concentrate passes through the partially exhausted chamber 83 by gravitationally flowing downwardly over the staggered baffles 86, whereby the entrained gas and any remaining moisture content of the substantially pure milk fat is expelled from the milk fat. Such expulsion of entrained gas and moisture purifies the milk fat concentrate to a concentration of approximately ninety-nine per cent. The pure milk fat which collects in the bottom of the chamber 83 is pumped therefrom through a further continuation of the pipe 62 by the pump 87 and forced to the churn 64. In the event that the pasteurizer 38 has been substituted for the evaporator 83, then the reseparation product is pasteurized and partially dehydrated and deodorized in the pasteurizer 38.

It should be noted at this point that, in the event it is not desired to further work the substantially pure milk fat obtained by this second variant of the instant invention, then such substantially pure milk fat may be withdrawn from the vacuum chamber 83 and conducted to any suitable package or container. If, however, it is desired to produce a butter-like product from the substantially pure milk fat, then the milk fat may be conducted through the churn 64, the aging cylinder 68, the texturator 72 and the molding and packaging device 74 in the same manner as previously described in connection with the processing of the standardized cream or milk fat concentrate for the manufacture of butter according to the improved process of this invention.

It has been pointed out in the process constituting the instant invention that the pasteurization of the milk fat product and the deodorization thereof is achieved by the use of a device of the type shown in Figure 5 of the drawings. It should be mentioned that, although this is the preferred type of combined pasteurizer and deodorizer, other types of apparatus, such, for example, as the type disclosed in U. S. Patent No. 2,130,643 and other similar devices, may readily be used. When the milk fat product being processed does not require deodorization then a more simplified pasteurizing apparatus, such, for example, as the type shown in U. S. Patent No. 1,693,034, may be used instead of the more complicated combined pasteurizer and deodorizer previously described.

The description of the preferred manner of practicing the variant of the process constituting this invention includes the "prechurning" of the cream which is preferably done in a "prechurn" of the type shown in Figure 3. It should, however, be remembered that the "prechurning" operation may be carried out in a vat, such as is shown in Figure 4, when such vat is provided with suitable means as illustrated for violently agitating the milk fat product while controlling the temperature thereof during its passage through the apparatus. When, however, the "prechurn" consists of an apparatus, such as is shown in Figure 4, then the flow of the product therethrough would not be continuous as would be the case if the "prechurn" consisted of a device, such as shown in Figure 3.

It was implied in the description of the preferred manner of practicing the instant invention, i. e., the improved manner of processing a product containing milk fat to produce butter, that the raw material was made up of sour cream containing approximately twenty per cent to forty per cent milk fat in the dispersed phase. It was pointed out that the excess acid of the sour cream should be suitably neutralized in the forewarming or receiving vat 17. Although it may be preferable to neutralize the sour cream at that stage of the improved process, it has been found that satisfactory results may also be obtained by neutralizing the milk fat containing product prior to churning. For example, the excess acid of the cream may also be neutralized immediately prior to the "prechurning" operation. Satisfactory results have also been secured by neutralizing the excess acid of the sour cream immediately after the first separation thereof but prior to the pasteurization of the milk fat product.

It will be evident from the foregoing description that the present improved process provides a means for continuously or substantially continuously producing a more stable butter having the desired and controllable texture and accurately regulated chemical and physical properties which determine the composition of the butter.

The texture of the improved product may be controlled to some extent by the incorporation into the product of a predetermined quantity of gas of the type previously mentioned. The loss of milk fat from the commencement of the improved process to the completion of the finished butter is generally of the nature of one and onefourth per cent. The overall loss of milk fat during the entire operation of the conventional batch process of churning and working butter, which involves the use of churns, forewarmers, pasteurizers, "ripening" and neutralizing tanks, etc., amounts to approximately one and one-half per cent to two per cent. It is, therefore, obvious that the instant invention constitutes a substantial improvement in the art of making butter, not only in view of the improved efficiency secured by reducing the loss of milk fat below that normally incurred in the conventional batch process of manufacturing butter, but also by the provision of a process in which the manufacture of butter may be carried on continuously and by which the various characteristics of the butter, such as texture, composition, spreadability, keeping qualities, coloring, flavoring and relative proportion of ingredients therein, may be accurately and satisfactorily regulated.

In the preceding description of the improved process and in the following claims various expressions common in the dairy industry have been used. Such expressions as, for example, "milk fat" and "butter fat" are intended to define the fat content of cream or milk. "Milk fat concentrate" has been used in a somewhat more flexible manner and is used generally to define the liquid which contains an abnormally high percentage of milk fat. In referring to the "standardization" of milk fat concentrate it is intended to include by such expression any one or more of the operations by which the percentage of milk fat in the milk fat concentrate, water content, acidity, color, flavor and salt content may be adjusted. More commonly, the adjustment of an excess acid condition is referred to as "neutralization." The coined expression "prechurn" identifies the mechanism for the performance of the operation which has been referred to as "prechurning" and which involves the violent agitation of a dairy product, such as milk or cream, for a sufficient period of time at a suitable temperature varying between thirty degrees Fahrenheit and one hundred ten degrees Fahrenheit to bring about the uniting of a substantial quantity of the milk fat globules normally contained in the milk or cream in the dispersed phase. Such a "prechurning" operation tends to destabilize at least a substantial portion of the milk fat content of the milk or cream.

The reference to "pasteurization" in the preceding description relates to a heat treatment operation of the milk or cream or milk fat concentrate during which the product is heated to a predetermined temperature for a predetermined period of time, all as well established by conventional practice.

The "churning" operation referred to herein contemplates the agitation and sufficient working of the product containing the milk fat concentrate, which product has preferably been standardized to secure the desired proportionate ratio between the ingredients thereof, which agitation and working causes a uniform blending and dispersion of all of the ingredients of the product being churned, as well as the solidification or super-cooling and conversion of the product into butter.

The "texturating" operation referred to in the preceding description preferably contemplates the further mechanical working of the churned product, whereby certain characteristics of the texture of the product may be varied at will. Said texturating may be accomplished by passing the product through a mechanical agitator, such as shown in Figure 6, but may also be accomplished by subjecting the product to a "wire drawing" operation by passing the product through restricted orifices, or by the agitation incidental to the molding or extruding of the finished butter, or by the passage of the product through a suitable length of conduit in the absence of agitation. The "aging" and "crystallizing" operation contemplates a substantially quiescent resting of the churned and normally super-cooled product for a sufficient period of time to permit the heat of crystallization to substantially re-establish the physical and chemical balance of the product. Such quiescent resting may be accomplished by the passage of the product through a suitable length of conduit at a suitable velocity in the absence of agitation, or by temporary storage in a container. The remaining expressions, such as "milk" and "cream," are used in the conventional manner herein.

The foregoing description of the preferred type of apparatus to be used in the instant invention, as well as the description of the improved process, is merely illustrative and the invention is not to be limited thereto. It will be obvious to those skilled in the art that various steps in the process may be varied to some extent and rearranged in sequence. For example, in the event that an open vat "prechurn," such as shown in Figure 4, is used in the performance of this process, then obviously the product, such as sour cream, may also be neutralized in the same vat. In such a procedure the cream would be supplied to the alternative form of "prechurn" from the storage tank, neutralized in the vat type of "prechurn" and, while being agitated to complete the neutralization operation, would be sufficiently agitated to also bring about "prechurning." The various separation operations referred to may obviously consist of gravity separations instead of the preferred centrifugal separations. Similarly the milk fat containing product may be heated to a suitable separation temperature prior to "prechurning" thereof immediately preceding the separation operation.

Further variations may obviously be made in an effort to secure the optimum conditions which have been mentioned for temperatures, pressures and periods of time for performing certain operations of the process, all of which determine the physical and chemical characteristics of the product produced. Obviously such determining elements of the process as temperatures, pressures and periods of time for performing certain operations must of necessity vary with the chemical and physical characteristics of the cream or milk fat being used, which characteristics in turn vary of necessity with the seasons of the year and to a great extent with the community from which the raw material, i. e., the milk or cream, is secured. The optimum conditions desirable under the varying circumstances may readily be determined by experimental tests.

It will be apparent to those familiar with the art of manufacturing butter or manufacturing standardized milk fat concentrate, that the hereinbefore described method or process of standardizing a hot oil in a continuous or substantially continuous process of manufacturing butter, is unique and enables the expeditious and efficient operation of a continuous or substantially continuous process of manufacturing butter or manufacturing standardized concentrated milk fat. It is of utmost importance in the manufacture of butter that the standardizing ingredients are uniformly dispersed throughout all of the product. Failing to secure and maintain uniform dispersion of the standardizing ingredients results in a product of inferior composition and quality. The present invention provides the process for securing and maintaining the complete and uniform dispersion of all of the standardizing ingredients throughout the product being processed, and enables the standardizing of the product to any degree desired.

It will be appreciated that in a process for the standardizing of liquid milk fat or oil, as constitutes the present invention, certain modifications or variations may immediately suggest themselves to those skilled in the pertinent arts, particularly when the invention is considered in the light of the foregoing description and accompanying drawings. Without question, various modifications may be made in the particular type of apparatus used in the practice of the invention. Accordingly, it is desired that this invention shall not be limited to the specifically described preferred embodiment, but that due latitude should be allowed in the interpretation of the invention.

Having thus described the illustrated and preferred embodiment of the invention in a system for the continuous or substantially continuous manufacture of butter or the continuous or substantially continuous manufacture of milk fat concentrate, the invention is not to be restricted to the specifically illustrated preferred embodiment thereof as hereinbefore set forth and as illustrated in the drawings, excepting in so far as necessary by the prior art disclosures and the appended claims.

The invention is hereby claimed as follows:

1. In the manufacture of a standardized product, the steps which comprise mixing a milk fat mixture having milk fat in the continuous phase and of a concentration of at least seventy percent and while at a temperature above the melting point of said milk fat with standardizing ingredients including non-fatty material, maintaining the resulting standardized mixture at a temperature above the melting point of said milk fat while concurrently agitating said mixture sufficiently to maintain a uniform dispersion of the standardizing ingredients without the incorporation of gases thereinto, and promptly thereafter cooling the standardized mixture to substantially form-retaining condition.

2. In the manufacture of standardized butter, the steps which comprise mixing standardizing ingredients including non-fatty material with a butter oil mixture having butter fat in the continuous phase and of a concentration of at least seventy per cent and while at a temperature within the range of one hundred to one hundred twenty degrees Fahrenheit and maintaining the thus standardized mixture at a temperature within the range of one hundred to one hundred twenty degrees Fahrenheit while concurrently agitating said standardized mixture sufficient to maintain a uniform dispersion of the standardizing ingredients without the incorporation of gas thereinto, and promptly thereafter cooling the standardized mixture to a substantially form-retaining condition to a temperature within the range of sixty to eighty degrees Fahrenheit while concurrently subjecting the mixture to further agitation and working of a degree sufficient to maintain said uniform dispersion.

3. In the process of making butter, the steps which comprise intimately and uniformly mixing standardizing ingredients including non-fatty material with a liquid containing in excess of eighty per cent milk fat in the continuous phase and at a temperature above the melting point of substantially all of said milk fat while concurrently agitating the thus standardized mixture to secure uniform dispersion of the standardizing ingredients throughout the mixture, maintaining the mixture while concurrently agitating the mixture at a temperature above the temperature at which the major portion of the milk fat content of the mixture commences to solidify to maintain the uniform dispersion of the standardizing ingredients within the mixture, and promptly thereafter cooling the standardized mixture to a temperature at which it is substantially form-retaining while subjecting the standardized mixture to further agitation and working of a degree sufficient to maintain the uniform dispersion of said standardized ingredients throughout the mixture.

4. In the process of making butter, the steps which comprise intimately and uniformly mixing standardizing ingredients including non-fatty material with a liquid containing in excess of eighty per cent milk fat in the continuous phase and at a temperature within the range of eighty to one hundred twenty degrees Fahrenheit while concurrently agitating the standardized mixture to secure uniform dispersion of the standardizing ingredients throughout the mixture, maintaining the mixture while concurrently agitating the mixture at a temperature within the range of eighty to one hundred twenty degrees Fahrenheit to maintain the uniform dispersion of the standardizing ingredients within said mixture, and promptly thereafter cooling the standardized mixture to a temperature within the range of sixty to eighty degrees Fahrenheit while subjecting the standarized mixture to further agitation and working of a degree sufficient to maintain the uniform dispersion of said standardizing ingredients throughout the mixture.

5. The process of making a standardized product from a mixture containing at least seventy percent milk fat in the continuous phase which comprises the steps of agitating the mixture while concurrently heating the mixture to a temperature above the melting point of the milk fat content thereof, adding standardizing material to said mixture while at a temperature above the melting point of the milk fat content of the mixture while continuing the concurrent agitation and heating thereof to secure and maintain a uniform dispersion of said standardizing material throughout said mixture, and promptly thereafter while said dispersion continues cooling the standardized mixture to a substantially form-retaining condition while subjected to further agitation of a degree sufficient to maintain said uniform dispersion.

6. The process of making standardized butter from a mixture containing at least seventy per cent butter oil in the continuous phase which comprises the steps of agitating and concurrently heating said mixture to a temperature above the melting point of the butter oil, adding standardizing ingredients including non-fatty material to the mixture while at a temperature above the melting point of the butter oil content of the mixture while continuing the concurrent agitation and heating to secure and maintain the uniform dispersion of said standardizing ingredients throughout said mixture without the incorporation of gas into said standardized mixture, and promptly thereafter while said dispersion continues cooling the standardized mixture to a temperature at which substantially all of the butter oil content thereof has been crystallized.

7. The process of making standardized butter from a mixture containing at least seventy percent butter oil in the continuous phase which comprises the steps of blending said mixture while at a temperature above the melting point of the butter oil content thereof with standardizing ingredients including non-fatty material, maintaining the standardized mixture at a temperature above the melting point of the butter oil content thereof while concurrently agitating said standardized mixture sufficient to secure and maintain the uniform dispersion of the standardizing ingredients throughout the mixture without the incorporation of gas thereinto, and promptly thereafter while said dispersion continues cooling the standardized mixture to substantially form-retaining condition while subjected to further agitation of a degree sufficient to maintain said uniform dispersion.

8. The process of making standardized butter from a mixture containing at least seventy percent butter oil in the continuous phase which comprises the steps of blending said mixture while at a temperature within the range of 100° F. to 120° F. with standardizing material while subjecting the mixture to concurrent agitation and heating sufficient to maintain the desired temperature of the mixture and to secure and maintain a uniform dispersion of the standardizing material throughout the mixture without the incorporation of gas thereinto, and promptly thereafter cooling the standardized mixture to a temperature at which a substantial portion of the butter oil content thereof is crystallized while subjecting the mixture during the continuance of said dispersion to further agitation of a degree sufficient to maintain said uniform dispersion.

9. The process of making standardized product from a mixture containing at least seventy percent butter oil in the continuous phase which comprises the steps of blending said mixture while at a temperature of approximately 110° F. with standardizing ingredients while subjecting the mixture to concurrent agitation and heating sufficient to maintain the desired temperature of the mixture and to secure and maintain a uniform dispersion of the standardizing ingredients throughout the mixture without the incorporation of gas thereinto, and promptly thereafter cooling the standardized mixture to a temperature of approximately 60° F., at which temperature a substantial portion of the butter oil content thereof is crystallized while subjecting the mixture during the continuance of said dispersion to further agitation of a degree sufficient to maintain said uniform dispersion.

10. In the manufacture of butter, the steps which comprise mixing standardizing ingredients with a butter oil mixture containing at least seventy percent butter oil in the continuous phase and while at a temperature within the range of 100° F. to 120° F., maintaining said standardized mixture at a temperature within the range of 100° F. to 120° F. while concurrently agitating said mixture sufficient to secure and maintain a uniform dispersion of the standardizing ingredients throughout the mixture without incorporating gas thereinto, and promptly thereafter cooling the standardized mixture to a substantially form-retaining condition at a temperature within the range of 60° F. to 80° F. while subjecting the mixture to further agitation and working of a degree sufficient to maintain said uniform dispersion.

11. In the process of making butter from a mixture containing at least eighty percent butter oil in the continuous phase, the steps which comprise agitating and concurrently heating the mixture to a temperature of approximately 110° F., adding standardizing material which includes non fatty material to the heated mixture while at a temperature of approximately 110° F. while continuing the concurrent agitation and heating to secure and maintain a uniform dispersion of said standardizing material throughout said mixture, and promptly thereafter while said dispersion continues cooling the standardized mixture to a temperature at which it is substantially form-retaining while subjecting the standardized mixture to further agitation and working of a degree sufficient to maintain the uniform dispersion of said standardizing material throughout the butter.

12. The process of making butter from a mixture containing in excess of eighty percent milk fat in the continuous phase and while at a temperature within the range of 80° F. to 120° F. which comprises the steps of concurrently agitating and heating the mixture to maintain the mixture at a temperature above the melting point of the milk fat content thereof, adding standardizing ingredients which includes non-fatty material to the mixture while at a temperature above the melting point of the milk fat content of the mixture and while continuing the concurrent agitation and heating to secure and maintain thereby a uniform dispersion of said standardizing ingredients throughout said mixture without the incorporation of gas thereinto, and promptly thereafter while said dispersion continues super-cooling the standardized mixture to a temperature of approximately 60° F. in a sufficiently short period of time to secure the crystallization of a substantial portion of the milk fat content thereof whereby to secure a substantially form-retaining product while subjecting the mixture to further agitation and working of a degree sufficient to maintain said uniform dispersion.

INGIE J. LUNDAL.
ROY P. ROBICHAUX.

REFERENCES CITED

The following references are of record in the file of this patent:

UNITED STATES PATENTS

| Number | Name | Date |
|---|---|---|
| 2,150,943 | Sharples | Mar. 21, 1939 |
| 2,299,440 | Van der Meulen | Oct. 20, 1942 |